UNITED STATES PATENT OFFICE.

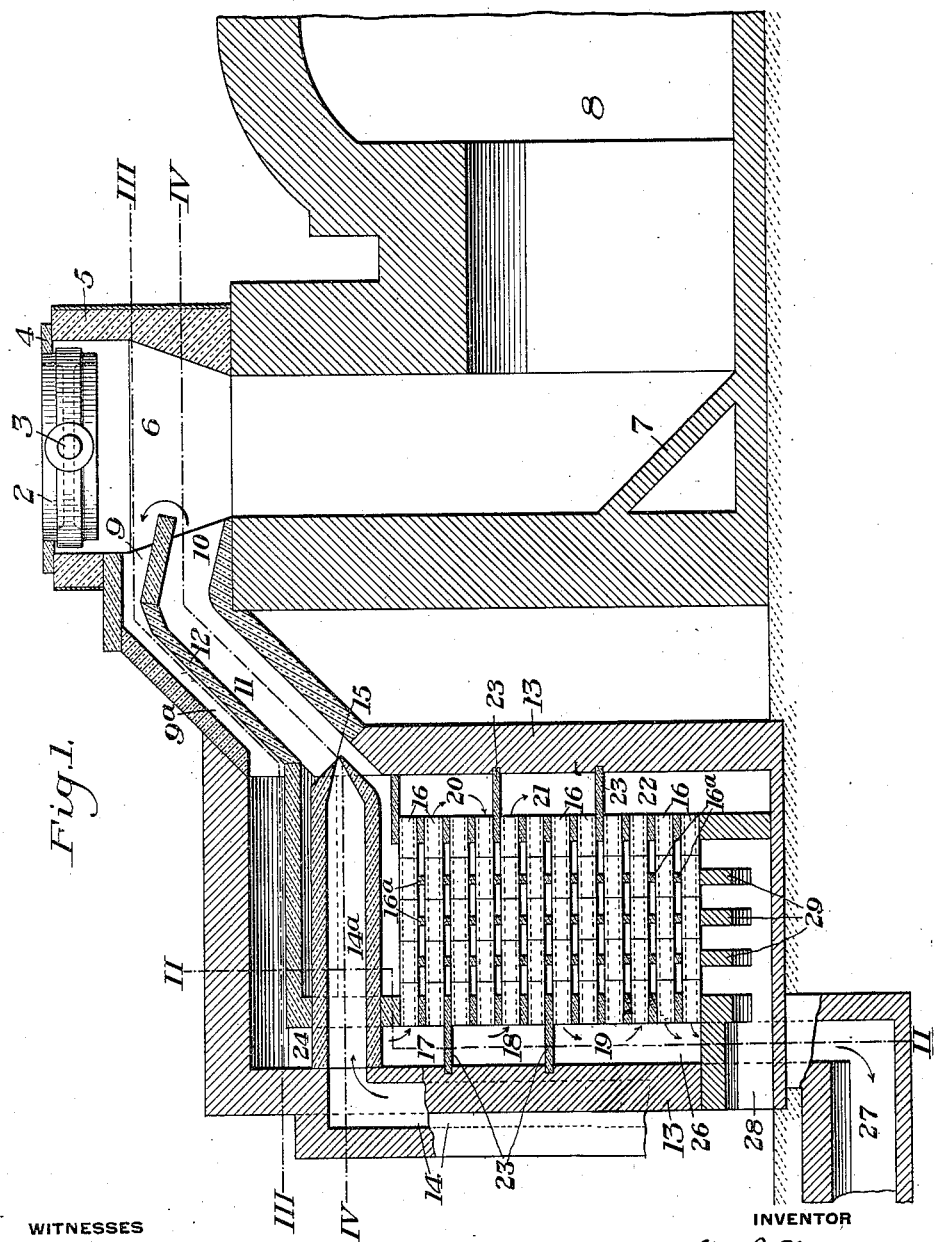

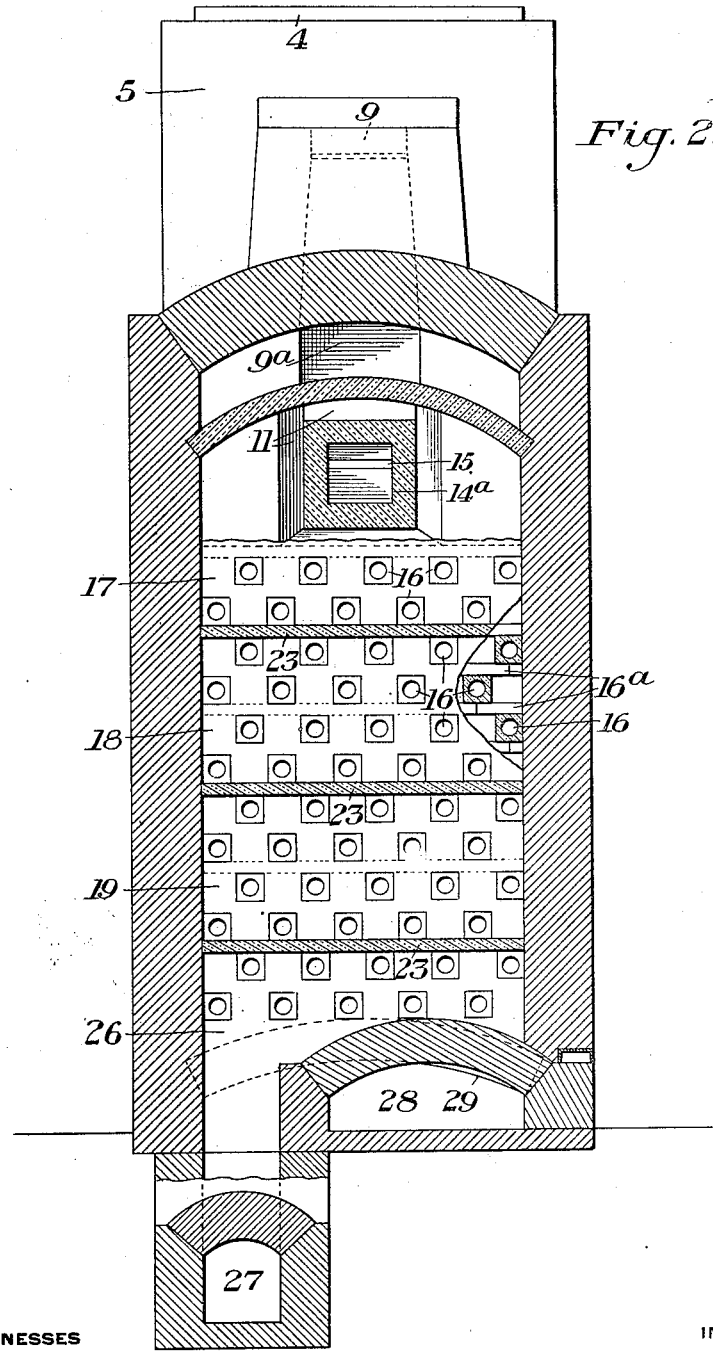

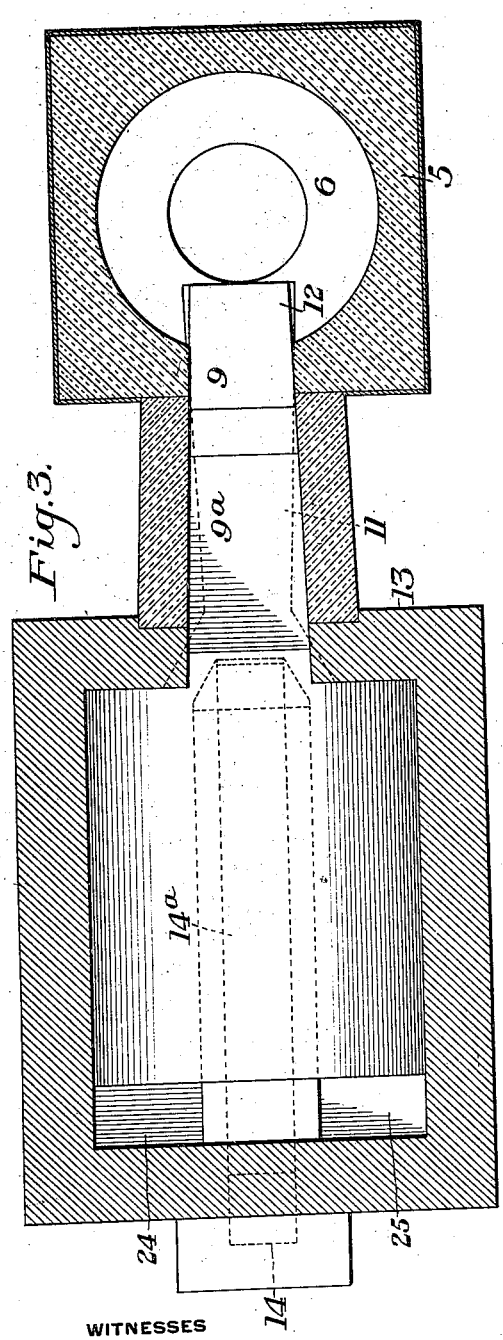
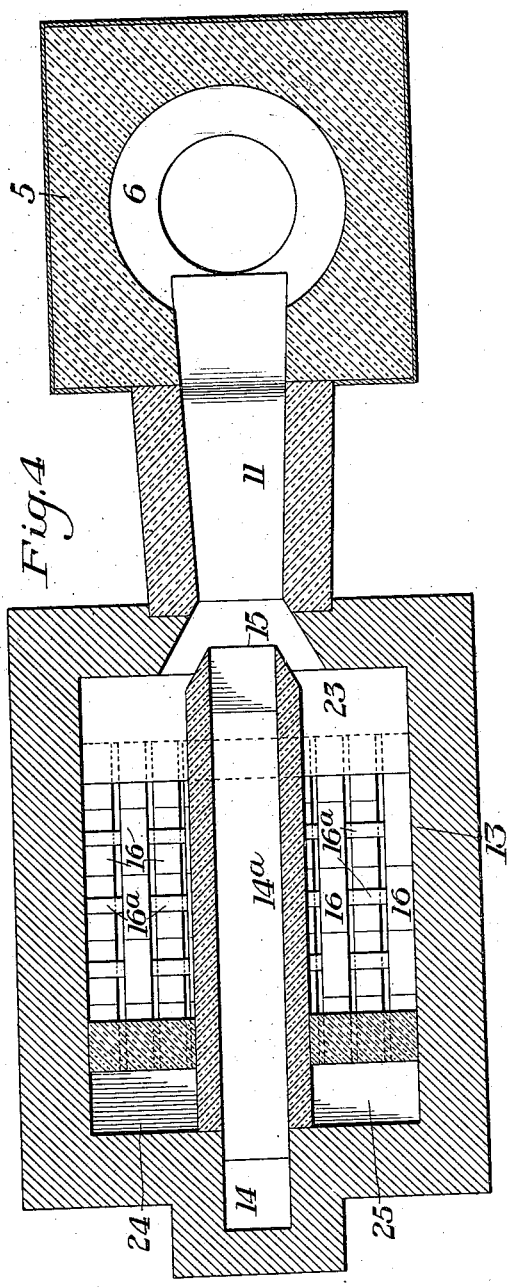

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

REGENERATIVE GLASS-DRAWING FURNACE.

1,157,246.     Specification of Letters Patent.     Patented Oct. 19, 1915.

Application filed June 23, 1913. Serial No. 775,252.

*To all whom it may concern:*

Be it known that I, WILLIAM L. MONRO, a citizen of the United States, residing at Pittsburgh, in the county of Allegheny and State of Pennsylvania, have invented a new and useful Improvement in Regenerative Glass-Drawing Furnaces, of which the following is a full, clear, and exact description, reference being had to the accompanying drawings, forming part of this specification, in which—

Figure 1 is a longitudinal vertical section showing a preferred form of my furnace. Fig. 2 is a vertical section on the line II—II of Fig. 1, Fig. 3 is a horizontal section on the irregular line III—III of Fig. 1, and Fig. 4 is a similar view on the irregular line IV—IV of Fig. 1.

My invention relates to regenerative furnaces and is particularly adapted to glass pot furnaces used for drawing glass, although it may be used for other heating purposes.

In the drawings, in which I show my invention as applied to a glass pot furnace 2 represents a reversible glass pot, preferably mounted on trunnions 3, and provided with top and bottom glass receiving cavities.

4 is a topstone, which may be lifted or moved to allow turning over of the pot. This pot sets in a refractory lined furnace 5, the bottom of which opens into a cave 6, preferably having an inclined bottom 7, which directs the glass drippings laterally.

8 is a tunnel opening into the bottom of the cave, this tunnel preferably being common to several of these caves, under several drawing pots, so that the attendant is given access to the glass drippings.

Two ports 9 and 10 open through the side wall of the furnace or cave, the lower port 10 leading from a combustion chamber 11, while port 9 is the outlet port. I have shown the port 10 and combustion chamber 11 as separated from the down-take port and channel by an inclined arched cap or separating wall 12. Both the down-take channel 9ª and the combustion chamber 11 extend from the top of a recuperator or double surface regenerator 13, in which the incoming air is heated by the outgoing products of combustion. The gas is shown as entering a flue 14 whence it passes into a refractory channel 14ª extending through the upper part of the regenerator chamber and terminating in a nozzle 15 having preferably a jet opening which is reduced in size and which directs the gas upwardly into the mixing and combustion chamber 11. The hot air from the recuperator circulates around this gas passage 14ª and mixes with the gas leaving the nozzle, being carried up by the jet action of the gas as well as by the draft of the stack and the tendency of the heated air to rise.

The recuperator is provided with horizontal rows of refractory pipes 16, which are spaced apart in each row, the pipes of one row being preferably staggered relative to those of the adjacent rows above and below it. The horizontal rows of pipes are separated by spaced part tiles 16ª and the ends of the pipes open into a series of chambers 17, 18, 19, 20 21 and 22 separated from each other by baffles 23. These baffles are shown as arranged so that there are two rows of pipes through which the products of combustion pass, these products then passing down and flowing back through the next pair of rows and so on from the top to the bottom of the recuperator. The gases enter the chamber 17 through ports 24 and 25, shown in Figs. 3 and 4, and from the chamber 26 they pass down around the air inlet to the stack flue 27. The air entering through the channel 28 passes in under the supporting piers 29 and flows upwardly around the refractory pipes or hollow tiles being given a more or less tortuous course by the staggered arrangement of the tiles of the successive rows. The air thus rising becomes effectually heated by the heat transmitted through the pipes and, enveloping the gas nozzle mixes with the issuing gas, the mixture turning in the combustion chamber and nozzle and entering the furnace while the products flow out through the superimposed take-down port.

It will be noted that the air rises during heating in the recuperator, thus giving it its natural course; and that it is preheated by the outgoing products of combustion, thus giving a very efficient recovery of heat from the waste gases. The fact that the recuperator is constructed in such a manner as to give a natural upward flow to the air is an important one. Heretofore, in the operation of regenerative glass pot furnaces, the regenerators have been of a type employing forced draft. In the operation of such furnaces, it has been found that it is impossible to prevent the deposition of carbon deposits on the pot to such an extent as to seriously injure the glass. This deposit of carbon is particularly objectionable in double cavity reversible pots.

The advantages of my invention result from the upward course of the air during heating, from the conduction of heat thereto, from the waste product flues; and also from the arrangement of the jet inlet for the gas which aids in mixing and entraining the air as well as assisting the air flow. A high temperature is thus obtained for melting the glass out of the pot.

In the operation of the furnace with a reversible pot, a glass article is drawn from the glass bath in the upper cavity of the pot, while the refuse glass is being melted out of the lower cavity. The pot is then turned over, the cleaned out cavity is filled with fresh glass, and the refuse glass is melted out of the other cavity while the glass-drawing operation goes on with the next batch.

The furnace may be used for other purposes than heating glass pots, and many changes may be made in the form and arrangement of the furnace recuperator, etc., without departing from my invention.

I claim.

1. A glass-drawing furnace having a well and a drawing pot supported on the upper part of the well, the well having below the pot a side inlet port and a gas-supply nozzle projecting into said port, a recuperator at one side of said well having an outlet connection into said port, and an outlet passage from the well to the recuperator, said recuperator having a natural draft upward flow air circulation, substantially as described.

2. A glass-drawing furnace having a well and a drawing pot supported on the upper part of the well, the well having below the pot a side inlet port and a gas-supply nozzle projecting into said port, a recuperator at one side of said well having an outlet connection into said port, and an outlet passage from the well to the recuperator, said recuperator being of the single pass, upward flow, natural draft type, substantially as described.

3. A glass-drawing furnace having a well and a drawing pot supported on the upper part of the well, the well having below the pot a side inlet port and a gas-supply nozzle projecting into said port, a recuperator at one side of said well having an outlet connection into said port, and an outlet passage from the well to the recuperator, said recuperator having an air supply inlet at its lower portion and vertical up-flow passages arranged to give a single natural draft up-pass to the air from the inlet to said port, substantially as described.

4. A glass-drawing furnace having a vertical well and a glass pot mounted at its upper portion, the well having an inlet port at one side thereof, and a gas supply discharging into said port, together with a recuperator arranged to deliver an upward flow of hot air into said port at the point of gas supply and beyond the recuperator, substantially as described.

In testimony whereof, I have hereunto set my hand.

WILLIAM L. MONRO.

Witnesses:
ALICE A. TRILL,
HENRY F. CLARK.